United States Patent
Champney et al.

(10) Patent No.: US 7,282,662 B2
(45) Date of Patent: Oct. 16, 2007

(54) PAINT GROOVE STUD

(75) Inventors: Clark Champney, Vermillion, OH (US); Terry Sterling, Strongsville, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 0 days.

(21) Appl. No.: 11/299,418

(22) Filed: Dec. 12, 2005

(65) Prior Publication Data

US 2007/0131658 A1   Jun. 14, 2007

(51) Int. Cl.
*B23K 9/20* (2006.01)

(52) U.S. Cl. ............................ 219/99; 219/98; 411/171

(58) Field of Classification Search ................. 219/98, 219/99; 411/171
See application file for complete search history.

(56) References Cited

U.S. PATENT DOCUMENTS

| | | | | |
|---|---|---|---|---|
| 2,402,659 A | * | 6/1946 | Nelson | 219/98 |
| 2,784,014 A | * | 3/1957 | Kelemen | 219/98 |
| 3,094,607 A | * | 6/1963 | Flynn et al. | 219/99 |
| 5,277,353 A | | 1/1994 | Budig et al. | 219/98 |
| 5,461,209 A | | 10/1995 | Yamada et al. | 219/99 |
| 5,579,986 A | * | 12/1996 | Sherry et al. | 228/175 |
| 6,077,096 A | | 6/2000 | Moring et al. | 439/92 |
| 6,176,662 B1 | | 1/2001 | Champney et al. | 411/171 |
| 6,357,110 B1 | * | 3/2002 | Shipp et al. | 29/825 |
| 6,491,487 B1 | | 12/2002 | Wojciechowski | 411/181 |
| 6,818,851 B2 | | 11/2004 | Ramasamy et al. | 219/98 |
| 6,906,277 B2 | * | 6/2005 | Nonaka | 219/99 |
| 2004/0112873 A1 | | 6/2004 | Ramasamy et al. | 219/98 |

* cited by examiner

*Primary Examiner*—Kevin P. Kerns
(74) *Attorney, Agent, or Firm*—Gifford, Krass, Sprinkle, Anderson, & Citkowski, P.C.

(57) ABSTRACT

A weld stud includes a cylindrical body having an outer surface and opposing first and second ends. At least one groove is formed in the outer surface of the cylindrical body. The groove extends helically about the cylindrical body from the first end toward the second end of the cylindrical body. A thread is formed on the cylindrical body and extends longitudinally from the first end towards the second end of the cylindrical body. The thread projects radially outward from the cylindrical body.

25 Claims, 2 Drawing Sheets

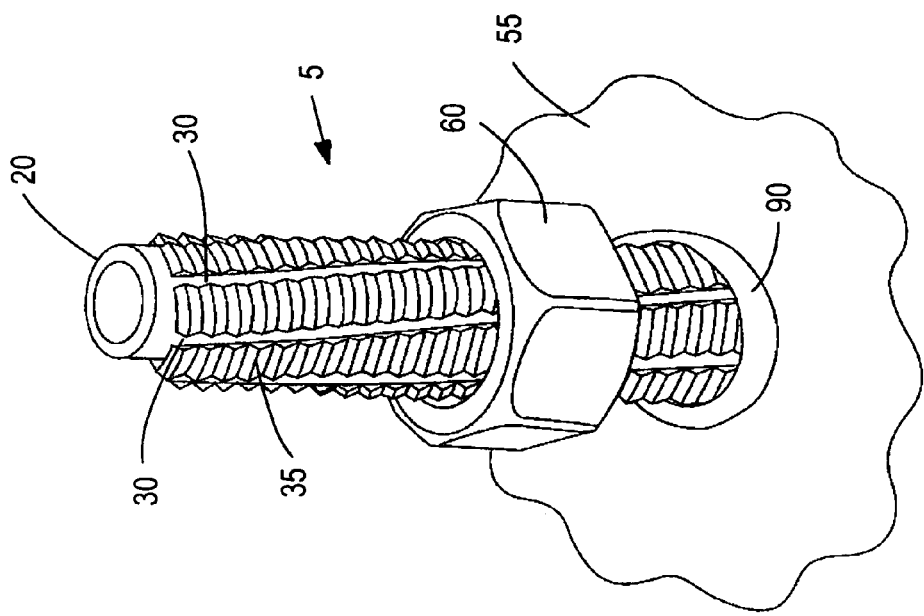
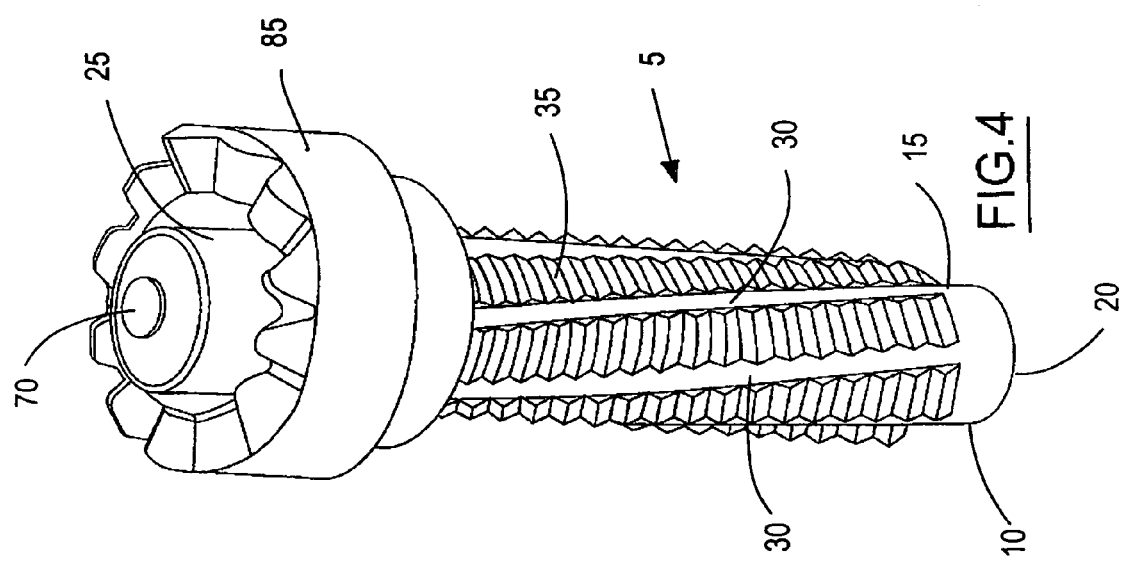

PAINT GROOVE STUD

FIELD OF THE INVENTION

This invention relates to weld studs, and with more particularity to weld studs having a paint groove.

BACKGROUND OF THE INVENTION

Threaded weld studs are often welded to products or work pieces prior to painting or coating of the work piece. The studs are applied to the work piece prior to the painting in an effort to eliminate the cost of removing paint from a work piece that would otherwise adversely affect the quality of the weld. Typically, threaded studs exposed to a painting operation without some sort of protection will have a coating of paint applied to the threads that would prevent proper fastening to the stud using a nut or other fastening component. In such situations, the threaded studs that are welded prior to the painting operation require thread protectors or covers that are installed on the stud prior to the painting operation. The protectors or covers must then be removed or uninstalled after the painting operation. The addition of protectors and covers increases the overall cost of manufacturing the desired part and also requires additional operations including the installation and removal of protectors following a paint operation.

There is therefore a need in the art for a threaded weld stud that may be attached or welded to a work piece prior to the painting operation that does not require a separate protector or cover while still maintaining the integrity of the threaded portion of the stud for fastening after a painting operation.

SUMMARY OF THE INVENTION

A weld stud includes a cylindrical body having an outer surface and opposing first and second ends. At least one groove is formed in the outer surface of the cylindrical body. The groove extends helically about the cylindrical body from the first end toward the second end of the cylindrical body. A thread is formed on the cylindrical body and extends longitudinally from the first end towards the second end of the cylindrical body. The thread projects radially outward from the cylindrical body.

There is also disclosed a process for welding a stud to a work piece that includes the steps of: providing a work piece; providing a welding tool having a weld gun portion and a stud retaining portion; providing a weld stud having a cylindrical body having an outer surface and opposing first and second ends and at least one groove formed in the outer surface of the cylindrical body, the groove extending helically about the cylindrical body from the first end toward the second end of the cylindrical body and a thread formed on the cylindrical body, the thread extending longitudinally from the first end toward the second end of the cylindrical body, the thread projecting radially outward from the cylindrical body; positioning a weld stud in the stud retaining portion; contacting the work piece with the weld stud; energizing the weld gun portion; moving the weld stud away from the work piece forming an arc between the work piece and the weld stud, locally melting the work piece and the weld stud; and plunging the weld stud into the work piece and allowing the work piece and weld stud to cool forming a weld joint.

BRIEF DESCRIPTION OF THE DRAWINGS

FIG. 4 is a perspective view of a weld stud having a ceramic ferrule disposed about an end of the weld stud;

FIG. 5 is a perspective view of a weld stud attached to a work piece detailing the weld fillet formed about the weld stud and work piece.

DETAILED DESCRIPTION OF THE INVENTION

Figure 1:
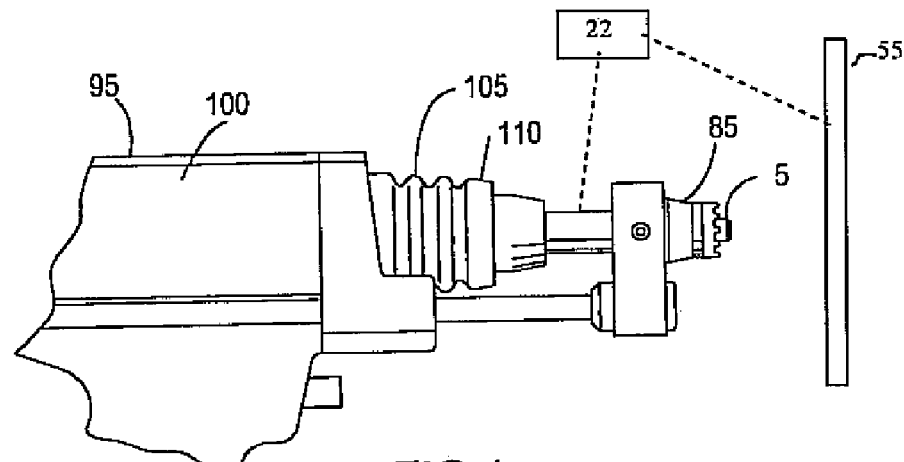
FIG. 1 is a partial side view of a weld gun including the weld stud of the present invention installed within the chuck of the weld gun and including a ferrule disposed about the weld stud.
Figure 2:
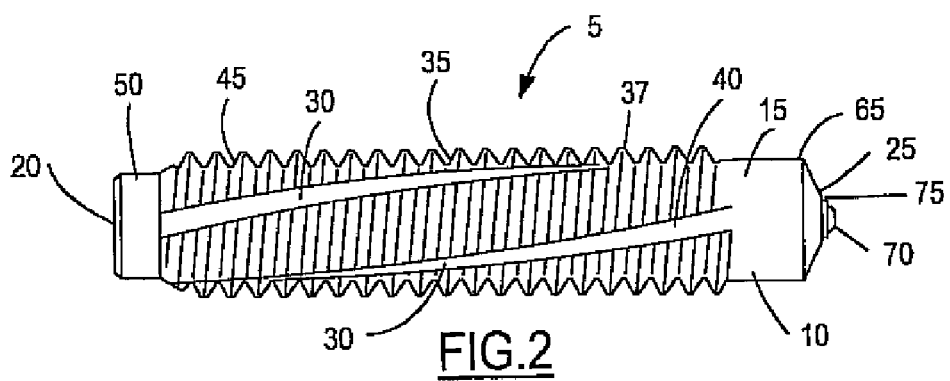
FIG. 2 is a side view of one embodiment of a weld stud according to the present invention.

Referring to FIG. 2, there is shown one embodiment of a weld stud 5 according to the present invention. The weld stud 5 includes a cylindrical body 10 having an outer surface 15 and opposing first and second ends 20, 25. At least one groove 30 is formed in the outer surface 15 of the cylindrical body 10 and extends helically about the cylindrical body 10 from the first end 20 toward the second end 25 of the cylindrical body 10. Additionally, a thread 35 is formed on the cylindrical body 10 and extends longitudinally from the first end 20 toward the second end 25 of the cylindrical body 10. The thread 35 projects radially outward from the cylindrical body 10.

The at least one groove 30 formed in the outer surface 15 of the cylindrical body 10 is adapted to channel paint off of the threaded portion 37 of the weld stud 5 following a painting operation. The at least one groove 30 is formed a sufficient depth into the cylindrical body 10 such that a base 40 of the groove 30 is below a base surface 45 of the thread 35 formed on the cylindrical body 10. In this manner, paint applied to the threaded portion 37 may be channeled into the groove 30 and will flow downward along the groove 30. Various numbers of grooves 30 may be utilized by the weld stud 5 of the present invention. In one aspect, the weld stud 5 may include from one to ten grooves 30 formed in the outer surface 15 of the cylindrical body 10. In another aspect of the invention, the weld stud 5 may include six grooves 30 formed about the cylindrical body 10 with each of the grooves 30 being spaced an equal amount from an adjacent groove 30.

Again referring to FIG. 2, it can be seen that the first end 20 of the weld stud 5 includes a reduced diameter portion 50 formed thereon for aligning a part with the axis of the weld stud 5 after it has been attached to a work piece 55. Additionally, the reduced diameter portion 50 allows for alignment of a nut 60 when it is attached to the threaded portion 37 of the weld stud 5, as seen in FIG. 5.

The second end 25 of the weld stud 5 includes a base surface 65 having flux 70 attached to the base surface 65. In one aspect of the invention, the base surface 65 is tapered at an angle away from the first end 20 of the cylindrical body 10. Additionally, the base surface 65 includes a cavity 75 formed therein and receives the flux 70 within the cavity 75. While the invention in the pictured embodiment discloses a base surface 65 having a cavity 75 with the flux 70 disposed therein, it should be realized that the flux 70 may otherwise be attached to the base surface 65 of the second end 25 of the weld stud 5. In one aspect of the invention, the flux 70 is made of pure aluminum and is in a ball form such that it may be disposed within the cavity 75 formed in the base surface 65 of the weld stud 5. Additional applications of the flux 70 to the weld stud 5 may include a sprayed-on flux or a washer-type flux having various shapes and styles applied to the base surface 65 of the weld stud 5.

Figure 3:
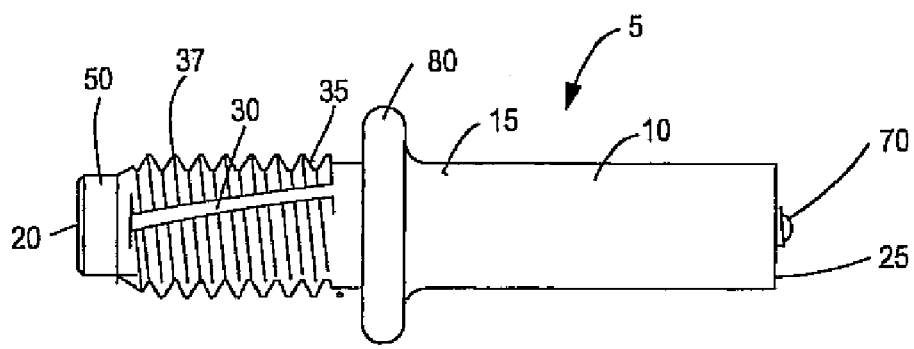
FIG. 3 is a side view of another embodiment of a weld stud according to the present invention.

Referring to FIG. 3, there is shown another embodiment of a weld stud 5 according to the present invention. As with the previously described first embodiment, the weld stud 5 includes a cylindrical body 10 having an outer surface 15 and opposing first and second ends 20, 25. Again, at least one groove 30 is formed in the outer surface 15 of the cylindrical body 10 with the groove 30 extending helically about the cylindrical body 10 from the first end 20 toward the second end 25 of the cylindrical body 10. However, a thread 35 is formed only on a portion of the cylindrical body 10 and terminates at an annular shoulder 80 that is formed on the cylindrical body 10 and is positioned between the first and second ends 20, 25 of the cylindrical body 10. As can be seen in FIG. 3, the thread 35 and the at least one groove 30 formed on the cylindrical body 10 extends from the first end 20 to the annular shoulder 80. As with the previously described first embodiment, the first end 20 of the weld stud 5 may include a reduced diameter portion 50 formed thereon for aligning a part with the weld stud 5. Additionally, the second end may include a base surface 65 having flux 70 attached to the base surface 65, as described above.

In one aspect of the invention, the weld stud 5 of the present invention is adapted to be utilized in a drawn arc welding process. Such a drawn arc process is designed to achieve the full structural strength of the mechanical connection between the weld stud 5 of the present invention and a work piece 55 to which it is attached. The drawn arc process requires a deeper penetration into a work piece 55 with higher currents and longer welding times in comparison to a short cycle welding operation. Studs utilized in such a drawn arc operation typically have a larger size such that the weld stud 5 exceeds one-quarter of an inch in diameter. The drawn arc process, because of the longer melting time and greater volume of melted material, may include a ferrule 85 disposed about the second end 25 of the cylindrical body 10 of the weld stud 5. In this aspect, the cylindrical body 10 extends beyond the ferrule 85 in the direction of the second end 25 of the cylindrical body 10 a predetermined distance as determined by the specific welding operation. A weld stud 5 including a ferrule 85 disposed about the second end 25 is best seen in FIG. 4. The ferrule 85 holds the pool of molten metal in place such that a weld fillet 90 is formed about the weld stud 5 and work piece 55, as best seen in FIG. 5. The ferrule 85 acts as a crucible to hold the weld together until the material has had sufficient time to solidify and form the fillet 90, as described above.

In an alternative aspect, the ferrule 85 may be replaced by an inert shielding gas such as argon or helium to maintain the pool of molten metal in a desired position to form a weld fillet 90 between the weld stud 5 and the work piece 55.

It is contemplated that the weld stud 5 of the present invention may be utilized in a stud welding system that includes a base material 55, a welding tool 95 having a weld gun portion 100 and a stud retaining portion 105, the weld stud 5, as described above, such that the stud retaining portion 105 includes a chuck 110 that is adapted to hold the weld stud 5. The chuck 110 includes a contact surface area that is sufficient to hold the weld stud in light of the at least one groove 30. The contact surface area of the chuck of the present invention has a greater contact surface area in relation to a standard chuck due to the at least one groove 30 that extends helically about the cylindrical body 10 of the weld stud 5. The at least one groove 30 provides a lower contact area on the stud 5 to be grasped by the chuck 110 in comparison to a stud without a groove. In this manner, the chuck 110 can grasp the held stud and maintain a firm positioning of the weld stud within the chuck.

Also disclosed by the present invention is a process for welding a stud 5 to a work piece 55 that includes the steps of providing a work piece 55; providing a welding tool 95 having a weld gun portion 100 and a stud retaining portion 105; providing a power source and timer controls 22; providing a weld stud 5 having a cylindrical body 10 having an outer surface 15 and opposing first and second ends 20, 25 and at least one groove 30 formed in the outer surface 15 of the cylindrical body 10 with the groove 30 extending helically about the cylindrical body 10 from the first end 20 toward the second end 25 of the cylindrical body 10 and a thread 35 formed on the cylindrical body 10, the thread 35 extending longitudinally from the first end 20 toward the second end 25 of the cylindrical body 10; positioning a weld stud 5 in the stud retaining portion 105; contacting the work piece 55 with the weld stud 5; energizing the gun portion 100; moving the weld stud away from the work piece 55, forming an arc between the work piece 55 and the weld stud 5 locally melting the work piece 55 and the weld stud 5; and then plunging the weld stud 5 into the work piece 55 and allowing the work piece 55 and weld stud 5 to cool forming a weld joint. The process of the present invention may also include the step of positioning a ferrule 85 about the weld stud 5 prior to contacting the work piece 55 for containing the melting work piece 55 and weld stud 5 and forming a weld fillet 90, as shown in FIG. 5. Additionally as outlined above, the ferrule 85 may be replaced with a shielding gas such that the process includes the step of providing a shielding gas when energizing the weld gun portion 100 again to contain the melting work piece 55 and weld stud 5 to form a weld fillet 90.

Should the process include a ferrule 85 positioned around the weld stud 5, an additional step of removing the ferrule 85 from the weld stud following cooling of the work piece 55 and weld stud 5 may be performed.

The step of positioning the stud within the retaining portion of the gun may be automated or may be manually performed. A feeding mechanism may be used to supply weld studs 5 and ferrules 85 to the welding tool 95.

In one aspect of the invention, the plunging step has a plunge distance greater than sixty-thousandths of an inch such that the weld stud 5 is plunged a sufficient distance into the work piece 55 to achieve the full mechanical strength of the welding operation. In another aspect of the invention, the energizing step has a time greater than 50 milliseconds with a current of from 60 to 1500 amps. Additionally, the process of the present invention may utilize a work piece 55 having a thickness of at least one fifth the diameter of the weld stud 5, such that the plunging step of the process of the present invention does not burn through or reduce the strength of the work piece 55.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A weld stud comprising:
   a cylindrical body having an outer surface and opposing first and second ends;
   a thread formed on the cylindrical body, the thread extending longitudinally from the first end toward the second end of the cylindrical body, the thread projecting radially outward from the cylindrical body and;
   at least one groove formed within and in addition to the thread formed in the outer surface, the groove formed at a depth such that a base of the groove is below a root surface depth of the thread, the at least one groove extending helically about the cylindrical body from the first end toward the second end of the cylindrical body.

2. The weld stud of claim 1 wherein a diameter of the weld stud exceeds one-quarter of an inch.

3. The weld stud of claim 1 wherein the weld stud includes from six to ten grooves.

4. The weld stud of claim 3 wherein the weld stud includes six grooves.

5. The weld stud of claim 1 wherein the first end includes a reduced diameter portion formed thereon for aligning a part with the weld stud after a welding operation.

6. The weld stud of claim 1 wherein the second end includes a base surface having flux attached to the base surface.

7. The weld stud of claim 6 wherein the base surface is tapered at an angle away from the first end of the cylindrical body.

8. The weld stud of claim 7 wherein the base surface includes a cavity formed therein and receiving the flux.

9. The weld stud of claim 1 including a ferrule disposed about the second end of the cylindrical body, the cylindrical body extending beyond the ferrule in the direction of the second end of the cylindrical body a predetermined distance.

10. The weld stud of claim 1 wherein the cylindrical body includes an annular shoulder formed thereon, the annular shoulder positioned between the first and second ends of the cylindrical body.

11. The weld stud of claim 10 wherein the thread and at least one groove formed on the cylindrical body extends longitudinally from the first end to the annular shoulder.

12. A stud welding system comprising:
   a base material;
   a power source and timer controls;
   a welding tool having a weld gun portion and a stud retaining portion;
   a weld stud, the weld stud having a cylindrical body having an outer surface and opposing first and second ends and a thread formed on the cylindrical body, the thread extending longitudinally from the first end toward the second end of the cylindrical body, the thread projecting radially outward from the cylindrical body; and at least one groove formed within and in addition to the thread formed in the outer surface, the groove formed at a depth such that a base of the groove is below a root surface depth of the thread, the at least one groove extending helically about the cylindrical body from the first end toward the second end of the cylindrical body;
   wherein the stud retaining portion includes a chuck adapted to hold the weld stud, the chuck having a contact surface area sufficient to hold the weld stud.

13. The weld stud of claim 12 wherein the first end includes a reduced diameter portion formed thereon for aligning a part with the weld stud after a welding operation.

14. The weld stud of claim 12 wherein The second end includes a base surface having flux attached to the base surface.

15. The weld stud of claim 12 including a ferrule disposed about the second end of the cylindrical body, the cylindrical body extending beyond the ferrule in the direction of the second end of the cylindrical body a predetermined distance.

16. A process for welding a stud to a work piece comprising the steps of:
   providing a work piece;
   providing a power source and timer controls;
   providing a welding tool having a weld gun portion and a stud retaining portion;
   providing a weld stud having a cylindrical body having an outer surface and opposing first and second ends and a thread formed on the cylindrical body, the thread extending longitudinally from the first end toward the second end of the cylindrical body, the thread projecting radially outward from the cylindrical body; and at least one groove formed within and in addition to the thread formed in the outer surface, the groove formed at a depth such that a base of the groove is below a root surface depth of the thread, the at least one groove extending helically about the cylindrical body from the first end toward the second end of the cylindrical body;
   positioning a weld stud in the stud retaining portion;
   contacting the work piece with the weld stud;
   moving the weld stud away from the work piece;
   energizing the weld gun portion forming an arc between the work piece and the weld stud locally melting the work piece and weld stud;
   plunging the weld stud into the work piece and allowing the work piece and weld stud to cool forming a weld joint.

17. The process of claim 16 including the step of positioning a ferrule about the weld stud prior to contacting the work piece for containing the melting work piece and weld stud and forming a weld fillet.

18. The process of claim 16 including the step of providing a shielding gas when energizing the weld gun portion for containing the melting work piece and weld stud and forming a weld fillet.

19. The process of claim 18 including the step of removing the ferrule from the weld stud following cooling of the work piece and weld stud.

20. The process of claim 16 wherein the second end of the weld stud includes a base surface having flux attached to the base surface.

21. The process of claim 16 wherein the step of positioning the stud in the stud retaining portion is automated.

22. The process of claim 16 wherein the plunging step has a plunge distance greater than sixty-thousandths of an inch.

23. The process of claim 16 wherein the energizing step has a time greater than 50 milliseconds.

24. The process of claim 16 wherein the energizing step has a weld current of from 600 to 1500 amps.

25. The process of claim 16 wherein the work piece has a thickness of at least one fifth of a diameter of the weld stud.

* * * * *